April 28, 1953     E. T. MORTON     2,636,228
REFRIGERATOR DOOR GASKET
Filed Aug. 18, 1949
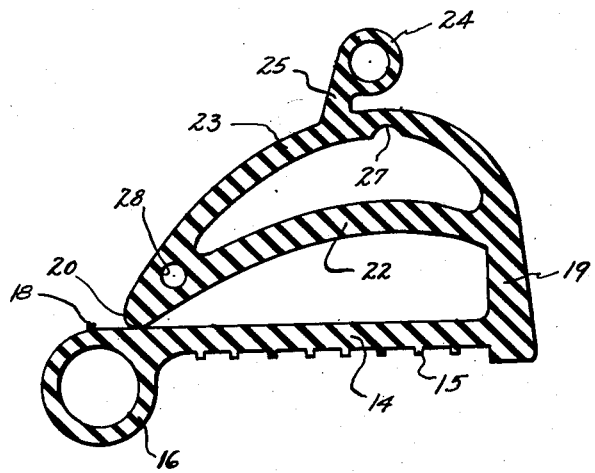
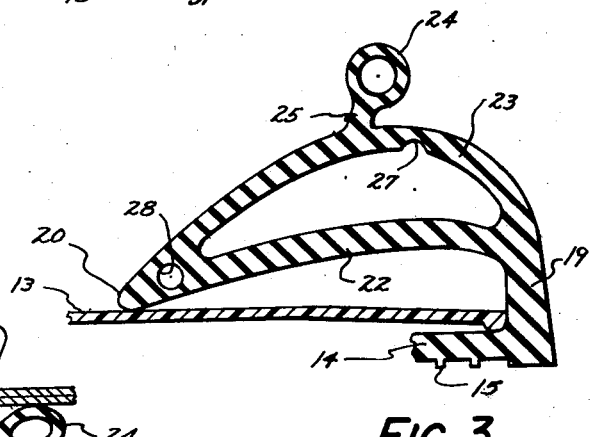
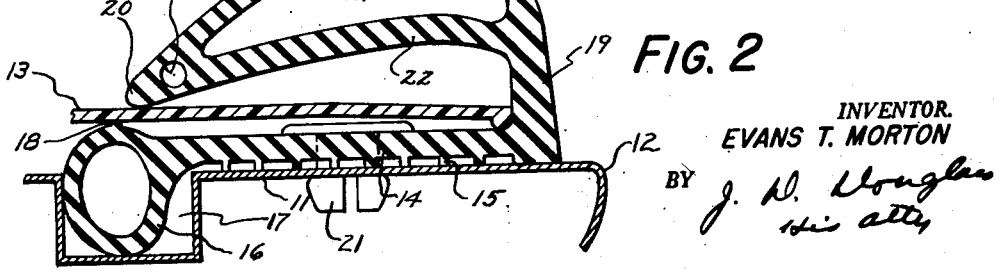
INVENTOR.
EVANS T. MORTON Patented Apr. 28, 1953

2,636,228

UNITED STATES PATENT OFFICE 2,636,228

REFRIGERATOR DOOR GASKET

Evans T. Morton, Chicago, Ill., assignor to Admiral Corporation, Chicago, Ill., a corporation of Delaware Application August 18, 1949, Serial No. 110,927

5 Claims. (Cl. 20—69)

This invention relates to gaskets and more particularly to an improved gasket for a refrigerator door.

In an ordinary household refrigerator it is very desirable to prevent any leakage of warm room air into the food compartment liner and the outer shell of the cabinet. It is, therefore necessary that an efficient gasket be found for use between the door and the rest of the cabinet. This gasket should preferably seat on the outer shell so as to prevent leakage into the space between the shell and the inner liner.

It is well known that in sheet metal structures of the size of a refrigerator cabinet or door, there may be considerable variation in a surface supposed to be flat. In order to seal the juncture of two such surfaces, it becomes necessary to use a thick gasket. It is also desirable to use a soft gasket to make possible the easy closing of the door. Because of those considerations, prior gaskets have been of soft extruded sections usually containing an air space. This air space made possible a soft gasket, but at the same time frequently caused the gasket to be so soft that the seal it was supposed to make was not air tight.

Several different shapes have been used in an attempt to avoid this difficulty. Among them are gaskets which have a corrugated sealing surface and one which has a single ridge with a weakened section beneath it on the surface intended to form the seal so that it will dimple at that point and always be pressed against that surface. All of these prior devices have been subject to disadvantages. Among them is the disadvantage of sealing to the breaker frame rather than the small area of outer shell customarily left facing the door. This allows the leakage of warm air into the insulation space. A further disadvantage in the tendency of the prior type gaskets to flatten out and become thinner at the corners where it is necessary to stretch or bend the outer edge of the gasket around the corner.

By my invention I eliminate these disadvantages. My invention comprises a gasket strip having a protuberance on the outer surface adapted to engage the outer shell of the cabinet and seal the door there. This protuberance is so constructed that on stretching the gasket around the corner while the main body of the gasket is flattened slightly, the protuberance rises away from the body and tends to keep the gasket the same thickness completely around the door.

A more complete understanding of my invention may be had by reference to the following description and figures which form a part of this specification.

Fig. 1 is a cross sectional view of my gasket in a normal state;

Fig. 2 is a similar view showing the installed gasket as it engages the shell of the refrigerator cabinet;

Fig. 3 is a view similar to Fig. 1 showing the change of position of the bead somewhat exaggerated as the gasket is stretched around the corners of the door; and Fig. 4 is a cross sectional view showing a different type of door engaging part.

Briefly, my invention comprises a hollow gasket for a refrigerator having a bead supported on its sealing surface by a cantilever means. The bead is so mounted that when it touches the wall of the refrigerator, the cantilever means causes the hollow gasket to deform and present additional surface to the wall to seal more securely.

More specifically and referring to the figures, my invention comprises a gasket adapted to be clipped to the flange 11 of a refrigerator door. This flange is formed around the edge 12 of the door which is generally dish-shaped and has a flange 11 at its edge extending inwardly. The clip used may be either a breaker frame 13 as described in my copending application, Ser. No. 161,663 filed May 12, 1950, or it may be a separate clip.

The gasket is an extruded rubber or synthetic rubber section as shown having a substantially flat piece 14 which engages the flange 11. Small ridges or corrugations 15 are preferably formed on the surface next to the flange in order to assure a better seal. At one end of this flat part 14, a tubular section 16 is formed on my preferred section. This section 16 engages the flange 11 at a channel section 17 and the breaker frame 13 as shown. A small ridge 18 is formed on the tubular section 16 to assure good sealing contact with the breaker 13 or the aforementioned clip. This structure is more fully explained in my aforementioned copending application.

The main body of the gasket is spaced from the flat part 14 by a fairly heavy section 19 at the outer part of the gasket. Before its installation, the gasket is formed as in Fig. 1 with the tip 20 of the body almost touching the flat part 14. When the gasket is installed, however, the breaker frame or inner door panel 13 is inserted between the tip 20 and the part 14 (Fig. 2) and, therefore, the tip 20 normally presses lightly on the breaker frame. The gasket may be conveniently held in place by push type fasteners 21 which are inserted merely by pressing them through a hole in the gasket and in the flange 11.

The body of the gasket is formed somewhat in hollow airfoil shape having an inner wall 22 and an outer wall 23. A tubular bead 24 is supported on the outer wall by a ridge 25 which holds the bead somewhat eccentrically. The ridge 25 is mounted obliquely to the outer surface of the outer wall 23, which feature combined with the mounting of the bead at some point other than on a center line thereof causes the unforeseen results when the gasket is bent around a corner, as described hereinafter. Thus when the bead is pressed on the shell 26 of the refrigerator, it is bent over (Fig. 2) as is more fully described hereinafter. On the inner surface of the outer wall 23 directly opposite the point the bead 24 hits when bent completely down, a weakening groove 27 is provided. A hole 28 may also be provided near the tip 20 to keep the gasket from being too stiff at any part and to avoid any very thick sections.

As stated above, when the door is closed and the gasket engages the flange of the outer shell of the cabinet, the bead 24 is bent downward toward the outer wall 23 of the gasket. This bending, however, causes the ridge 25 to act as a cantilever beam and cause a bending movement to be transmitted to the wall 23 of the gasket. The movement causes a deformation of this wall as shown in Fig. 2 and results in the outer wall engaging the cabinet breaker strip 29 to form a secondary seal while the bead 24 forms a primary seal with the shell 26. The weakening groove 27 allows the bead to be pressed into the outer wall 23 of the gasket to insure that the secondary seal of the wall 23 with the breaker strip 29 will be formed properly.

An additional feature of this type of construction is its characteristic when bent around a corner. Most refrigerator gaskets of the hollow type tend to flatten out when stretched, particularly when they are bent around corners such as the upper arcuate corners of a refrigerator door. They thus are likely to form an imperfect seal at the corners. The present gasket has a characteristic which avoids this likelihood. As my gasket is stretched around a corner, some combination of forces causes the bead 24 to rise away from the main body of the gasket as shown in slightly exaggerated form in Fig. 3, and thus as the body flattens out similarly to prior gaskets, the bead rises and maintains full or almost full thickness of the gasket at the corners.

It is conceived that several methods of fastening the gasket to the door may be used, and that therefore it may be necessary to form the gasket differently at its door engaging surfaces. One such variation is shown in Fig. 4 where the gasket is formed to embrace a flange 31 of the door and is held in place there by the forked end 32 of the door breaker strip. It is apparent that this forked end could be replaced by a spring clip which might also support the inner wall of the door.

Thus it is apparent that I have provided a gasket which provides a seal not only more efficient along the sides of the door, but also considerably more efficient at the corners of the door.

Having thus described my invention, I am aware that numerous departures and changes may be made therefrom without departing from the spirit or scope of my invention.

I claim:

1. A gasket for a refrigerator door comprising a strip of rubber-like material having a cross section shaped with a flat, door engaging part having a ribbed surface for engaging said door, a body connected to said door engaging part, a ridge formed on the outer surface of said body at an angle oblique to said surface, and a bead attached to said ridge, said ridge being substantially tangential to said bead.

2. A gasket for a refrigerator door comprising a strip of rubber-like material having a cross section shaped with a door engaging part, a hollow body connected to said door-engaging part and having an inner wall adjacent said door-engaging part, and an outer wall, a ridge formed on said outer wall at an angle oblique to the surface thereof, a bead on said ridge, said outer wall being formed with a weakening groove at the point directly beneath said bead.

3. A gasket for a refrigerator door comprising a strip of material having a cross section shaped with a door engaging part, a hollow airfoil-shaped section attached to said door engaging part and having inner and outer walls, a tubular bead mounted on said outer wall on a ridge formed thereon, said ridge being formed at an angle oblique to the surface of said outer wall and being attached to said bead substantially tangential thereto.

4. A refrigerator door gasket adapted to be secured adjacent the edge of a refrigerator door to provide a seal with the outer edges of the refrigerator box, comprising a strip having a cross section shaped with a base part, a support extending from said base part away from the inner face of said door, a body section carried by said support and extending inwardly from the door edge, said body section being formed with a free edge portion extending laterally from the support, the exterior surface of said body section being curved convexly and being formed with an outwardly extending ridge at the apex of said surface, said ridge extending from said surface at an angle oblique thereto at the junction line, and a bead on said ridge.

5. A refrigerator door gasket adapted to be secured adjacent the edge of a refrigerator door to provide a seal with the outer edges of the refrigerator box, comprising a strip having a cross section shaped with a base part, a support extending from said base part away from the inner face of said door, a body section carried by said support and extending inwardly from the door edge, said body section being formed with a free edge portion adapted to move laterally of the door edge when the gasket is deformed by its engagement with the edges of said box, the exterior surface of said body section being curved convexly and being formed with an outwardly extending ridge at the apex of said surface, said ridge extending from said surface at an angle oblique thereto at the junction line, and a bead on said ridge, said bead being adapted to be pressed against said body section when said door is closed, and said body section being formed with a weakening groove in the surface opposite the line of contact of said bead with said body section when said door is closed.

EVANS T. MORTON.

References Cited in the file of this patent

UNITED STATES PATENTS

| Number | Name | Date |
|---|---|---|
| 2,033,436 | McCormick | Mar. 10, 1936 |
| 2,091,791 | Newman | Aug. 31, 1937 |
| 2,263,831 | Welch | Nov. 25, 1941 |

FOREIGN PATENTS

| Number | Country | Date |
|---|---|---|
| 436,480 | Great Britain | Oct. 11, 1935 |
| 603,013 | France | Jan. 5, 1926 |